W. W. DUNCAN.
TESTING MACHINE.
APPLICATION FILED MAR. 16, 1910. RENEWED APR. 27, 1912.
1,045,825.
Patented Dec. 3, 1912.
3 SHEETS—SHEET 2.
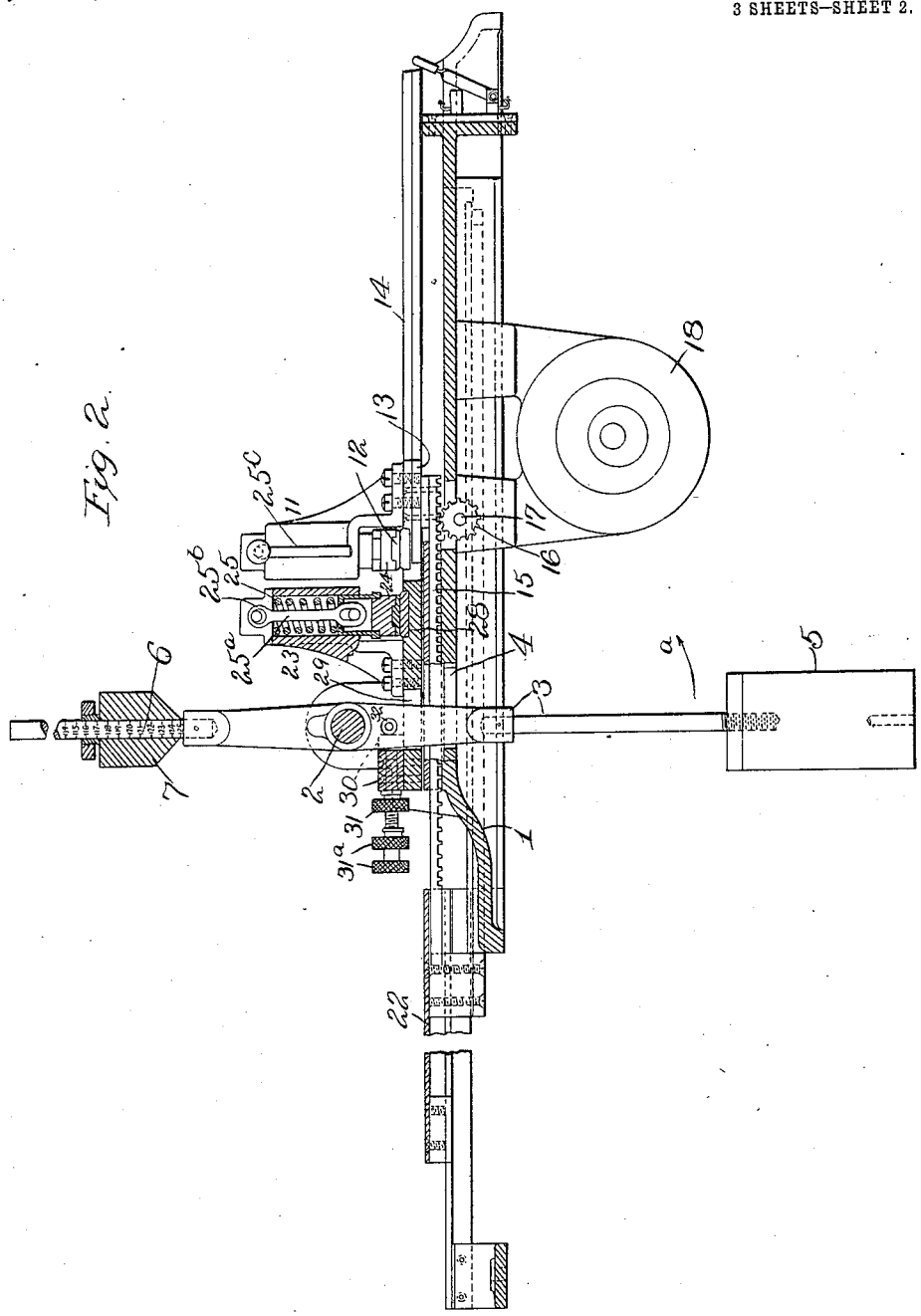

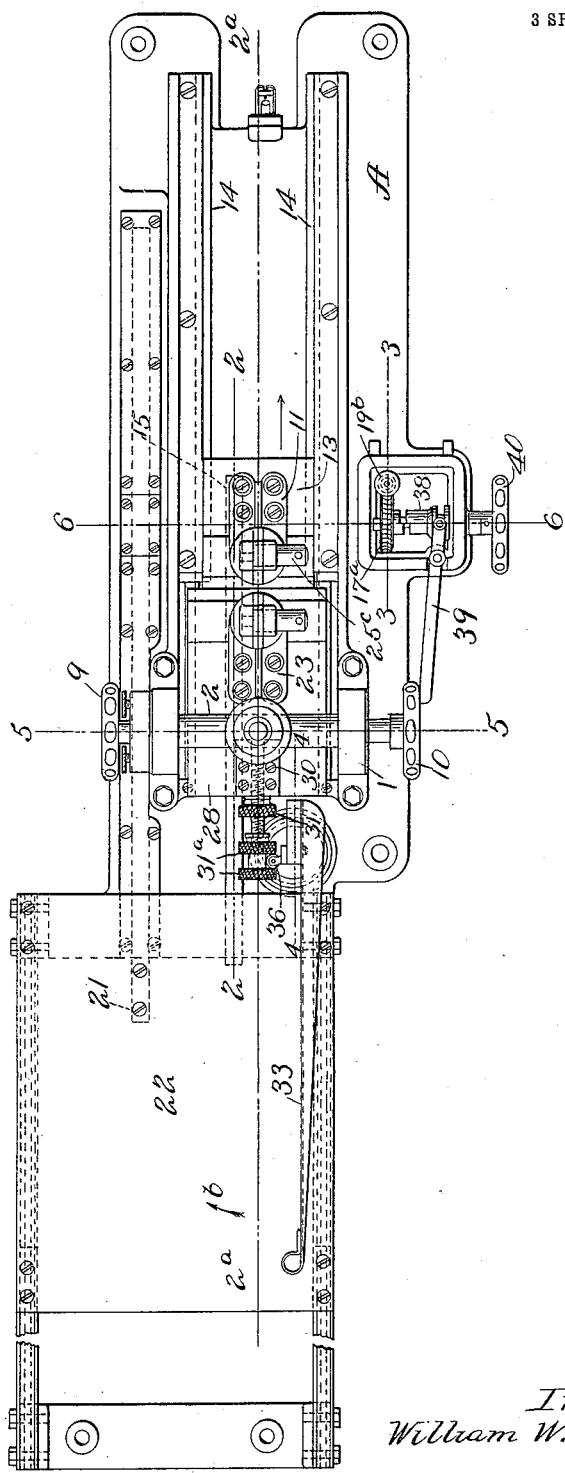

W. W. DUNCAN.
TESTING MACHINE.
APPLICATION FILED MAR. 16, 1910. RENEWED APR. 27, 1912.
1,045,825.
Patented Dec. 3, 1912.
3 SHEETS—SHEET 3.
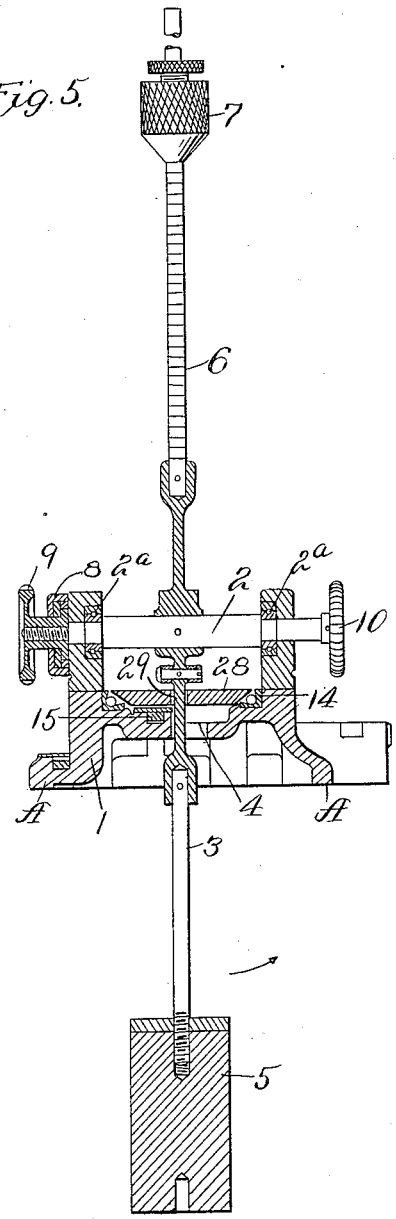
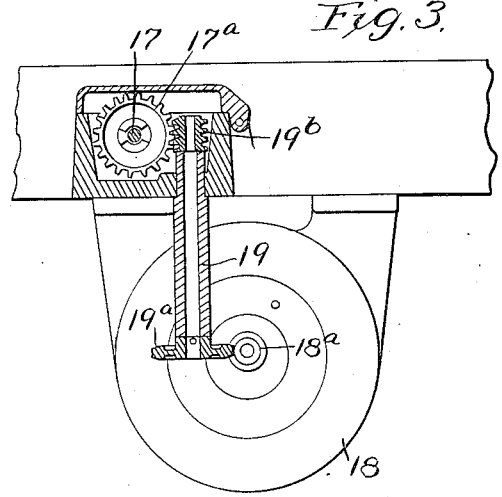
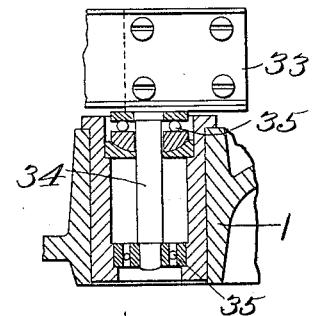
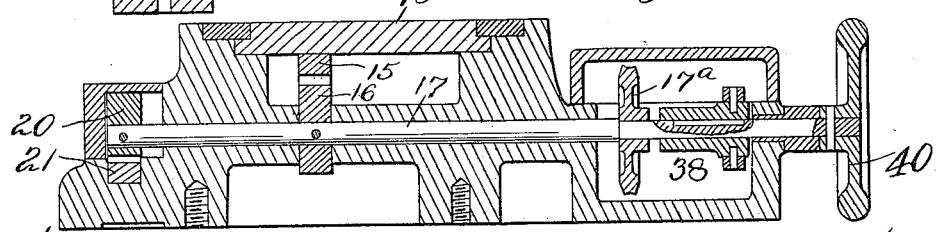

UNITED STATES PATENT OFFICE.

WILLIAM W. DUNCAN, OF WATERTOWN, MASSACHUSETTS, ASSIGNOR TO HOOD RUBBER COMPANY, OF BOSTON, MASSACHUSETTS, A CORPORATION.

TESTING-MACHINE.

1,045,825.  Specification of Letters Patent.  Patented Dec. 3, 1912.

Application filed March 16, 1910, Serial No. 549,782. Renewed April 27, 1912. Serial No. 693,560.

*To all whom it may concern:*

Be it known that I, WILLIAM W. DUNCAN, citizen of the United States, residing at Watertown, Massachusetts, have invented certain new and useful Improvements in Testing-Machines, of which the following is a specification.

This invention relates to a self registering and test comparing testing machine and more particularly to machines for testing sheets or strips of vulcanized rubber.

The invention is an improvement on the machine patented on April 20, 1909, No. 919140, and comprises the novel features of construction and arrangement and combination of parts hereinafter described and particularly pointed out in the claims.

In the present machine every test piece is pulled out at the same rate of speed and under a constant pressure; the test piece is held by the jaws under the same conditions each time; a curve of the test is drawn on a chart; the test pressure is kept constantly balanced and the difference in thickness between different test pieces is compensated.

The invention is illustrated in the accompanying drawings in which:—

Figure 1 is a plan view. Fig. 2 is a section of the frame on line 2—2 of Fig. 1, and of the slide on line $2^a$, $2^a$. Fig. 3 is a section on line 3—3, Fig. 1. Fig. 4 is a section on line 4—4, Fig. 1. Fig. 5 is a section on line 5—5 Fig. 1. Fig. 6 is a section on line 6—6, Fig. 1.

As shown in these drawings, 1 represents the frame of the machine supporting a horizontal shaft 2 journaled in ball bearings $2^a$ on which the weight beam 3 is mounted. As shown the weight beam passes through a slot 4 in the base and has a weight 5 secured to its lower end. Its upper end carries a graduated rod 6 having an adjustable weight 7 thereon.

8 is a clutch of any well known form serving to prevent the beam from slipping back and racking the machine when the test piece breaks.

9 is the release wheel for the clutch and 10 is a hand wheel for turning the beam back to zero.

11 is one gripping device or jaw holder having a rawhide jaw 12. This holder is mounted on a sliding plate 13 sliding in guideways 14 formed in the frame 1. Said plate 13 is provided with a rack 15 on its under face with which meshes a pinion 16 mounted on a shaft 17, journaled in the frame. This shaft is driven from a motor 18 through worm $18^a$ meshing with worm wheel $19^a$ on a shaft 19 provided at its opposite end with a worm $19^b$, which in turn meshes with worm wheel $17^a$ on shaft 17. The shaft 17 is also provided with a second pinion 20 directly back of pinion 16, which meshes with a rack 21, which is reversely arranged or inverted in respect to the rack 15 so that on the rotation of the shaft 17 the racks are moved in opposite directions. The rack 21 is connected with a table 22 slidably mounted on the frame and adapted to carry a paper chart. The other gripping device or jaw holder 23 is mounted on a plate 28 slidably mounted on the frame and provided with a hole 29 through which the weight beam passes. The blocks 24 of both jaw holders are held down by springs 25 and are raised by links $25^a$ connected to eccentrics $25^b$ provided with operating handles $25^c$. The plate 28 carries a block 30 adjustable by means of a turn screw 31 threaded through a lug on the plate 28, and this block engages a roller 32 on the beam. 33 is a pencil carrying arm mounted on a shaft 34 rotating in ball bearings 35 in the frame 1, (see Fig. 4). The arm is provided with a projection 36 carrying an anti-friction roller which engages between the flanges $31^a$ of the screw 31 so that the arm will be oscillated when the plate 28 is moved. The free end of the arm is provided with means for holding a pencil which engages the chart on the table 22.

By means of the weight 7 the machine may be adjusted to suit various thicknesses of test pieces and by making the jaws of rawhide, the danger of cutting the test piece is obviated and the springs 25 apply the same pressure to the blocks 24 so that if a portion of the test piece held by said block is squeezed out the block will hold just the same.

The worm gear $17^a$ is loose on the shaft 17 and is designed to be connected therewith by a clutch member 38 splined on the shaft and operated by a hand lever 39. When the parts are in readiness to test a piece clutch 38 is operated to connect worm wheel 17ª with the shaft, while after the test is completed and it is desired to reset the parts in normal position the clutch is disengaged and shaft 17 rotated in a reverse direction by a hand wheel 40.

The machine operates in the following manner:—The plates 13 and 28 being in proximity and the jaws open, a piece to be tested is placed in them. The jaws are then closed by dropping the handles 25ᶜ and a chart properly scaled is placed on the table 22. The motor 18 is then started so as to move the plate 13 to the right and the table 22 containing the chart to the left. As the plate 13 is connected to the plate 28 by the test piece, the plate 28 also moves to the right and this plate by means of the block 30 engaging the roller 32 moves the beam 3 in the direction of the arrow $a$ Fig. 2, and by means of the projection 36 said plate will also move the arm 33 in the direction of the arrow $b$, Fig. 1. As the weight beam 3 rises it exerts a tension on the test piece which is registered upon the chart by means of the pencil in pounds. The table 22 holding the chart is meanwhile moving to the left at the same speed as the test piece is stretching to indicate the amount of stretch so that the strength for every interval of stretch is registered upon the chart by means of the pencil.

I claim as my invention:—

1. In a testing machine, a gripping device, a chart carrying table, means for moving the gripping device and table in opposite directions, a second movable gripping device adapted to be connected with the first device by the strip to be tested, a marker contacting with the chart on the table and actuated by the movement of the second gripping device and means for applying a gradually increasing resistance to the movement of said second gripping device.

2. In a testing machine, a gripping device, a chart carrying table, means for simultaneously moving the table and gripping device in opposite directions, a second gripping device arranged to have sliding movement and to be connected with the first gripping device by the strip to be tested, a pencil carrying arm connected with the second gripping device and movable transversely across the table by the movement of said gripping device and means for applying a gradually increasing resistance to the movement of the second gripping device.

3. In a testing machine, a gripping device, a chart carrying table, oppositely arranged racks connected with said gripping device and table, a shaft, pinions thereon engaging with the racks to move the gripping device and table in opposite directions, means for rotating the shaft, a second gripping device adapted to be connected with the first gripping device by means of the strip to be tested, means for applying a gradually increasing resistance to the movement of the second gripping device, an arm movable transversely of the table, a marker carried thereby and means whereby said arm is operated by the movement of the second gripping device.

4. In a testing machine, a gripping device, a chart carrying table, means for moving the gripping device and table in opposite directions, a second sliding gripping device adapted to be connected with the first gripping device by means of the strip to be tested, a weight beam oscillated by the movement of the second gripping device, a marker and means whereby it is moved transversely over the table by the movement of the second gripping device.

5. In a testing machine, a pair of sliding gripping devices adapted to be connected together by the strip to be tested, a chart carrying table, means for moving one gripping device and the table in opposite directions, a marker, means for causing it to be moved transversely across the table by the movement of the other gripping device and a vertically arranged weight beam oscillated by the movement of the last mentioned gripping device.

6. In a testing machine, a pair of gripping devices adapted to be connected to each other by means of the piece to be tested, a chart carrying table, means for moving one gripping device and the table in opposite directions, a marker carrying arm adapted to be oscillated across the table by the movement of the other gripping device, a vertical weight beam oscillated by the movement of the last mentioned gripping device and means for adjusting said beam.

7. In a testing machine, a pair of sliding gripping devices adapted to be connected by the strip to be tested, a chart carrying table, means for moving one gripping device and the table in opposite directions, a marker, means for causing it to be moved transversely across the table by the movement of the other gripping device, a weight connected to be raised by the movement of said last named gripping device, and means for preventing the weight from falling on the breaking of the strip being tested.

8. In a testing machine, a gripping device, a chart carrying table, oppositely arranged racks connected with said gripping device and table, a shaft, pinions thereon engaging with the racks, a second gripping device adapted to be connected with the first gripping device by means of the strip to be tested, means for applying a gradually increasing resistance to the movement of the second gripping device, a marker arm movable transversely of the table, means whereby said arm is moved by the movement of the second gripping device, a motor for operating the shaft, and means for disconnecting the motor and shaft to permit the parts to be returned to normal position.

In testimony whereof, I affix my signature in presence of two witnesses.

WILLIAM W. DUNCAN.

Witnesses:
F. M. READ,
C. A. SENF.

Copies of this patent may be obtained for five cents each, by addressing the "Commissioner of Patents, Washington, D. C."